Aug. 13, 1929.  E. BARNFATHER  1,724,121
DIRIGIBLE HEADLIGHT
Filed Nov. 12, 1928   2 Sheets—Sheet 1
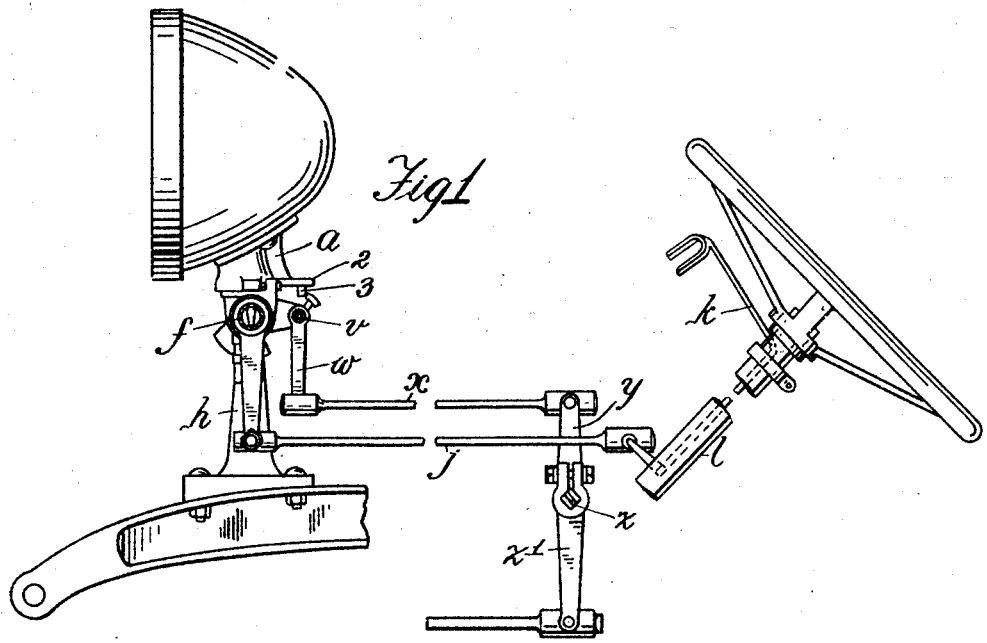
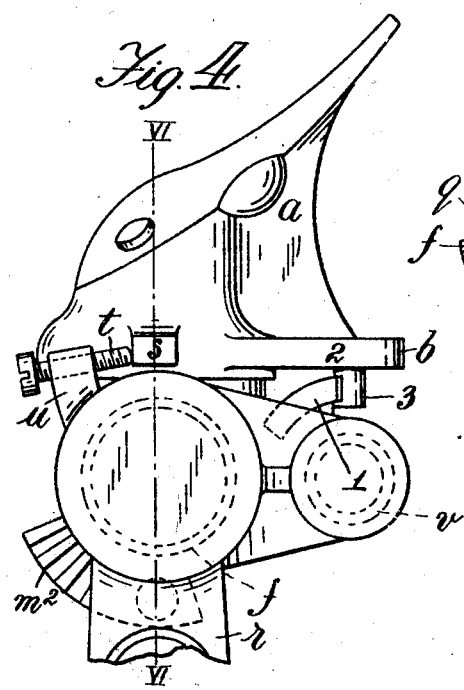
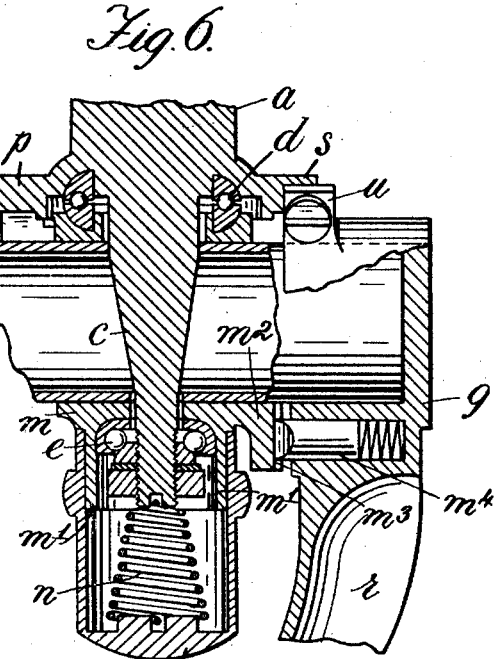

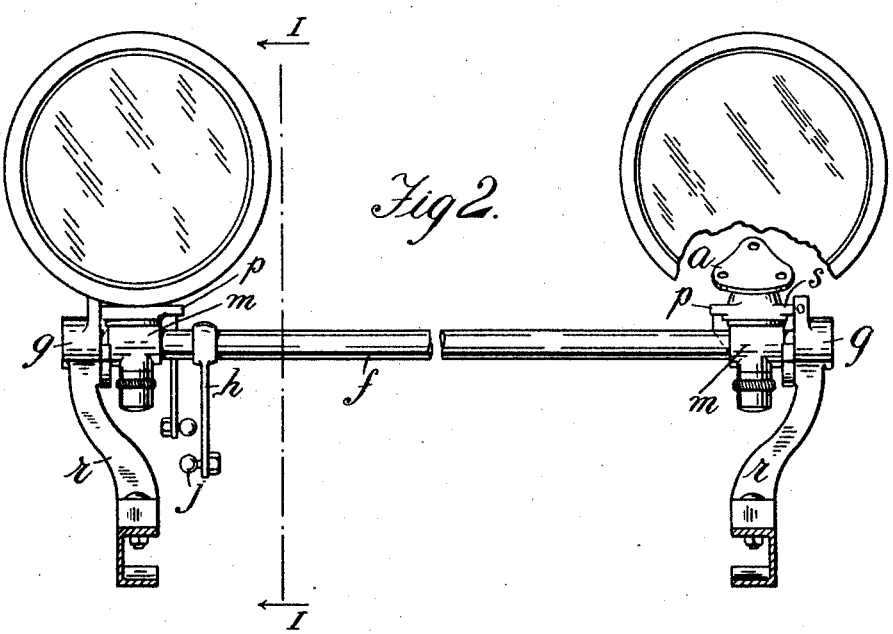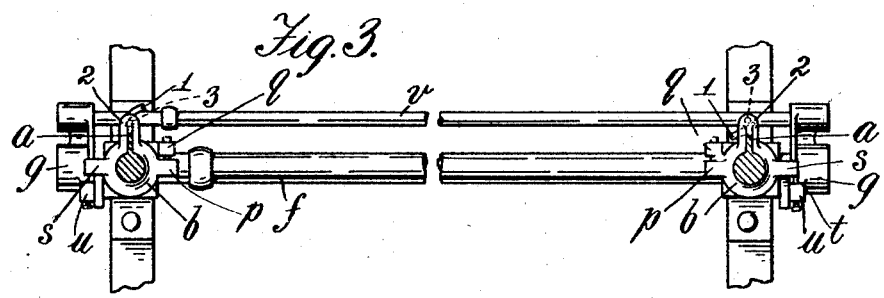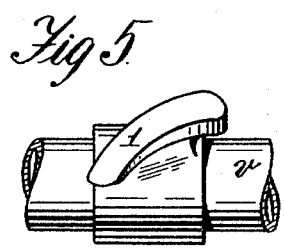

Patented Aug. 13, 1929.

1,724,121

UNITED STATES PATENT OFFICE.

EDWARD BARNFATHER, OF LONDON, ENGLAND, ASSIGNOR TO CORRECTA LIGHT LIMITED, OF LONDON, ENGLAND, A CORPORATION OF GREAT BRITAIN.

DIRIGIBLE HEADLIGHT.

Application filed November 12, 1928, Serial No. 318,841, and in Great Britain October 12, 1927.

This invention comprises improvements in dipping and swivelling mechanism for vehicle head and like lights, and an important object of this invention is to provide simple and reliable mechanism for controlling dipping of the head lights with simultaneous swivelling of one of the said head lights. A further object is to adapt this mechanism for use in combination with mechanism operated from the steering gear and effective for swivelling one or other of the lamps in accordance with steering movements to the right hand or to the left hand as the case may be. Thus with a full combination in accordance with these improvements, one of the head lamps is automatically swivelled in the direction of steering, the two head lamps can be caused to dip by exercise of a control from the driver's seat and during such dipping the near side head light is automatically swivelled towards the near side for the purpose of illuminating that side and showing up any kerb, channel, ditch or other dangerous roadside formation.

In accordance with these improvements, the swivel mounting of a lamp comprises a projection which is engaged and arrested by a stop when the lamp is dipped, whereby the lamp is turned about its swivel at the same time that it is dipped. In the ordinary way each of the two head lamps on a motor car would have a swivel mounting comprising a spring constantly tending to keep its lamp in the normal or beam ahead position but the stop aforesaid would be fitted only in conjunction with the near side lamp which would be the lamp on the left hand side in this country. For running in a country where the right hand side rule prevails, the stop could be removed from the left hand side and fitted in conjunction with the projection of the swivel mounting of the right hand side lamp.

Further, in accordance with these improvements the swivel mountings of the head lamp comprise an arm adapted for engaging with a respective cam device, the two cam devices being on a rock shaft which is rocked in accordance with the steering. In one direction of steering, one of the cams engages the adjacent arm of the swivel mounting and swivels the lamp on that mounting in the direction of steering but the other cam moves away from its arm and has no effect so that the swivel mounting and lamp thereon are unaffected and that lamp remains in the beam-ahead position. When such lamps are dipped by the dipping mechanism, the arms move out of the influence of the cams so as to be unaffected by the steering, the near side lamp being thereupon automatically swivelled towards the near side as explained above. During the daylight running the lamps may be dipped so that the arms are disengaged from the cams and none of the swivelling mechanism is in operation which saves any unnecessary wear and tear of such mechanism.

In order to enable the invention to be readily understood reference is made to the accompanying drawings illustrating one example of mechanism embodying these improvements, in which drawing:—

Figure 1 is a sectional side elevation, the section being taken on the line I—I of Figure 2.

Figure 2 is a front elevation and

Figure 3 is a sectional plan.

Figure 4 is a side elevation to a larger scale of lamp swivelling means such as are seen in Figure 1.

Figure 5 is a plan of a cam seen in Figure 4.

Figure 6 is a vertical section on the line VI—VI of Figure 4, but with the upper part broken away.

In the several figures $a$ are the lamp supports, which may be of any suitable kind, and each is carried upon a swivel mounting comprising a horizontal disc device $b$ and a depending stem $c$, see Figure 6. The disc is supported on a ball bearing $d$ and the lower end of the stem $c$ is fitted with the inner race ring of a centering thrust ball bearing $e$. The lamp swivels are mounted upon a rock shaft $f$ supported in bearings $g$ across the front of the vehicle, this rock shaft being connected by a suitable transmission with a control lever near the driver's seat. Thus, the rock shaft $f$ may have a drop arm $h$, Figures 1 and 2, connected by a rod $j$ with a lamp dipping control device $k$ on the steering column $l$. The lamp swivels may be mounted by fitting the shaft $f$ at its ends with sleeve devices $m$ each formed at the top with an annulus for receiving a race ring of the ball bearing $d$ and below with a depending socket $m'$ in which is housed the outer race ring of the ball bearing $e$. As will be seen from Figure 6, the stem $c$ is tapered and passes diametrically through appropriate holes formed in the sleeve $m$ and shaft $f$. The lower end of the stem $c$ is slotted in order to have engagement with one end of a torsional spring $n$, the latter being non-rotatably contained in a cap $o$ fitted on to the depending socket $m'$. The torque of the spring $n$, when the parts are fixed in position, tends constantly to turn the lamp supports to a normal position in which they are arrested by stops $q$. As will be seen clearly from Figures 2 and 3, each of the disc devices $b$ is formed with a radial projection $p$ which comes against the stop $q$ which in the example shown is a screw adjustable in a lug carried by the sleeve $m$.

Upon each of the swivel discs $b$ there is also a small peripheral or radial projection $s$ and in the path of this projection $s$, at the near side of the vehicle, there is a stop which may be wholly detachable or which, as shown in the drawings and most clearly in Figures 4 and 6, may consist of a screw $t$ adjustably screwed through a lug $u$ on the bearing $g$. There is a similar lug $u$ on the bearing $g$ at the off side of the vehicle but there is no screw in that lug when the rule of the road is to drive on the left hand side.

Thus, when the control $k$ is exercised to rock the shaft $f$ in the direction for dipping the beams of the lamps, that is to say to turn the shaft $f$ counter-clockwise in Figures 1 and 4, the projection $s$ of the near side swivel is immediately arrested by the stop $t$ and, being prevented from moving around the axis of the rock shaft $f$, is perforce caused to move around the swivel axis thereby causing the near side lamp support $a$ to swivel in the near side direction as the lamp on such support is dipped. During this operation, the off side lamp, that is to say the lamp situated at the left hand side of Figures 2 and 3, is not swivelled but is simply tilted for the dipping of its beam. The reason for this is that there is no screw stop $t$ in the lug $u$ at that side. If the car is to be driven in a country in which the rule of the road is to drive on the right hand side, the screw $t$ is removed from the lug $u$ on the right hand side of Figures 2 and 3 and is inserted and adjusted in the lug $u$ on the left hand side, as shown in dotted lines in Figure 3. In that event, the lamp at the right hand side of Figures 2 and 3 will be merely dipped when the shaft $f$ is rocked, whereas the lamp at the left hand side will be dipped and swivelled towards the right hand side of the road, as will now be readily understood.

The mechanism for automatically swivelling the lamps in accordance with the steering may comprise a second rock shaft $v$ mounted just behind and parallel with the rock shaft $f$. It is convenient to connect an arm $w$ on this shaft $v$ with an arm $y$ on the rock shaft $z$ of the steering gear, by means of a rod $x$. Preferably the arm $y$ is fixedly connected with the drop arm $z'$ on the rock shaft $z$ the single clamping bolt of the latter serving for fixing the two arms. In this way, the shaft $v$ is rocked forwards or backwards as the steering is leftwards or rightwards as the case may be. Near each end of the shaft $v$ there is fixedly mounted a cam 1 of somewhat helical or quick thread configuration as seen in Figures 3 and 5, but the cam near one end is reversely disposed as compared with the cam near the opposite end, as will be readily seen by comparing the two cams 1 in Figure 3. When the lamps are in the position of normal beam elevation, as seen in Figures 1 and 4, studs 3 on arms 2 projecting from the swivels are in close proximity to respective helical cams 1. If the vehicle is steered to the left-hand the cam shaft $v$ may be rocked rearwards or clockwise in Figures 1 and 4. This will bring the near side or left hand cam 1 into operative engagement with its stud 3 so that the near side lamp will be caused to swivel leftwardly. This rearward rocking of the shaft, however, merely carries the offside or right hand cam 1 away from its stud 3 so that the steering towards the near side or left hand has no effect upon the off side lamp. If the vehicle is steered from the straight to the right hand, the forward rocking of the shaft $v$ will cause the cam 1 at the left hand side of Figures 2 and 3 to engage with its stud 3 for swivelling the off side lamp, whereas the near side lamp will be unaffected as the cam 1 at the right hand side of Figures 2 and 3 will be merely carried away from its stud 3. It will be apparent that after each steering and swivelling operation, the spring $n$ will return the swivelled lamp to the beam ahead position.

In the lamp dipping mechanism illustrated the sleeves $m$ on the rock shaft $f$ may be formed with flanges or segments $m^2$ provided with teeth $m^3$, and spring bolts $m^4$ may be provided in the brackets $r$ for engaging with the teeth $m^3$. By this means, the lamps are locked and held in any position to which they may be adjusted by the dipping control. When the lamps are dipped by the dipping control to a suitable extent, the arms 2 and studs 3 move out of range of the cams 1 so as to be unaffected by the steering. During daylight running, the lamps may be dipped to the said extent so that the swivelling mechanism may not operate which saves any unnecessary wear and tear of such mechanism.

I claim:

1. Lamp dipping and swivelling mechanism for vehicle head lights, comprising in combination a rockable lamp swivel, a projection on said swivel, and a stop adapted for arresting said projection when said swivel is rocked for dipping the lamp.

2. Lamp dipping and swivelling mechanism for vehicle head lights, comprising in combination a rockable lamp swivel, elastic means torsionally operative on said swivel, a projection on said swivel, and a stop adapted for arresting said projection when said swivel is rocked for dipping the lamp whereby said swivel and lamp are turned against the action of said elastic means.

3. Lamp dipping and swivelling mechanism for a vehicle head light, comprising a swivel lamp mount carried on a rock shaft, manually controlled means operative for rocking said shaft, a peripheral projection on said mount, and an adjustably mounted stop adapted for arresting said projection when said shaft and lamp mount are rocked for dipping the head light.

4. Lamp dipping and swivelling mechanism for vehicle head lights comprising swivel lamp mounts carried on a rock shaft, spring devices, constantly operative on said mounts to maintain normal beam-ahead position, peripheral projections on said mounts, a stop adapted for arresting the projection of one of said mounts when said shaft is rocked for dipping the lights, a member movable in consonance with the steering gear of the vehicle, and inter-engaging devices on said swivel mounts and member whereby one lamp or the other is swivelled in accordance with the steering during normal elevation of the lights.

5. Lamp dipping and swivelling mechanism for vehicle head lights comprising swivel lamp mounts carried on a rock shaft, spring devices constantly operative on said mounts to maintain normal beam-ahead position, lateral peripheral projections on said mounts, a stop adapted for arresting the lateral projection of one of said mounts when said shaft is rocked for dipping the lights, and rearwardly disposed projections on said mounts these projections being in operative relation with means operated by the steering mechanism during the condition of normal elevation of the lights for the purposes set forth.

6. Lamp dipping and swivelling mechanism for vehicle head lights comprising swivel lamp mounts carried on a rock shaft, lateral projections on said mounts, a stop adapted for arresting the lateral projection of one of said mounts when said shaft is rocked for dipping the lights, bearings for said rock shaft, and bolt and sector locking means operative between said bearings and shaft for locking the latter in selected angular positions.

7. Lamp dipping and swivelling mechanism for vehicle head lights comprising swivel lamp mounts carried on a rock shaft, abutment means operative during rocking of said shaft for swivelling one of said mounts, abutment means supported parallel with said shaft and movable in accordance with the steering, and abutment projections on said swivel mounts said projections being adapted for extending normally into the path of the secondly named abutment means and to be removed from such path when said shaft is rocked to dip the lights.

EDWARD BARNFATHER.